July 8, 1941.  O. W. DOMRIES  2,248,...
IMPLEMENT CONSTRUCTION
Filed June 12, 1940  2 Sheets-Sheet 1
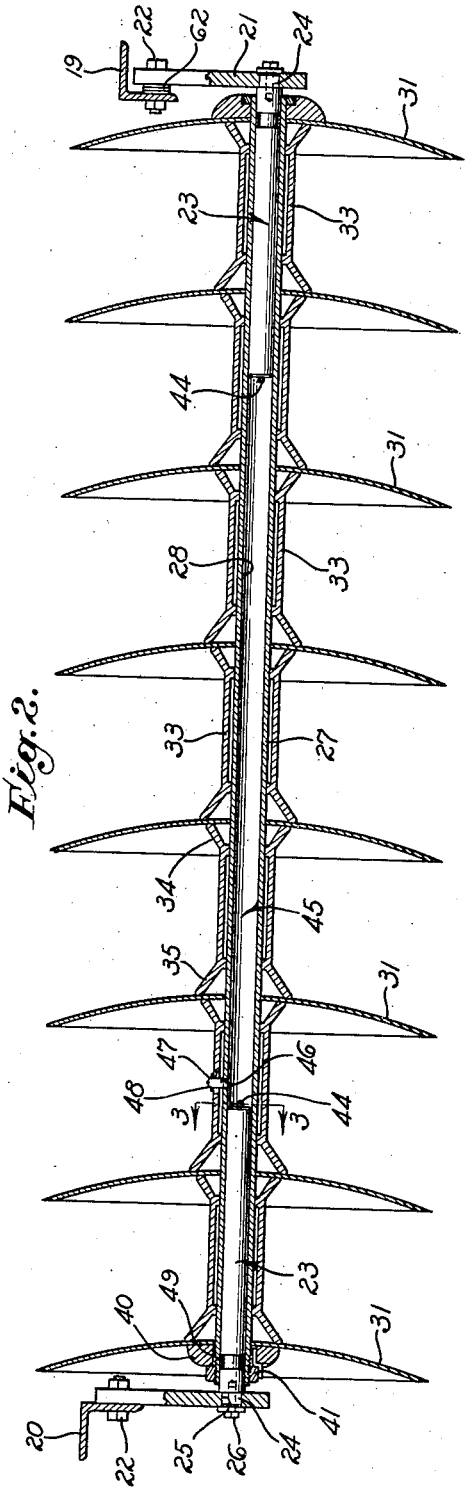
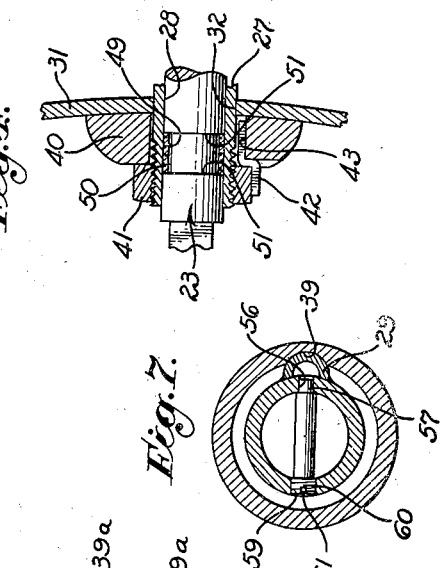
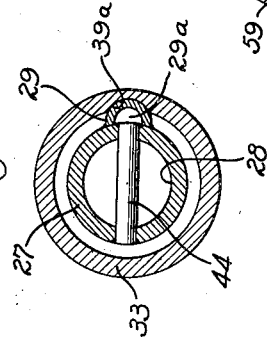
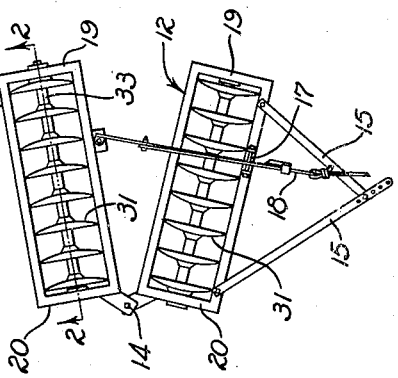
INVENTOR
OTTO W. DOMRIES
BY
HARRIS, KIECH, FOSTER & HARRIS
FOR THE FIRM
ATTORNEYS July 8, 1941.     O. W. DOMRIES     2,248,069
IMPLEMENT CONSTRUCTION
Filed June 12, 1940     2 Sheets-Sheet 2
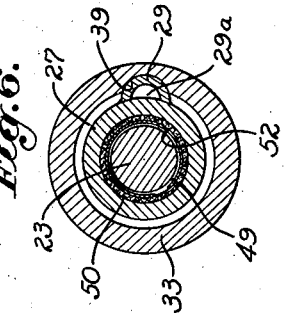
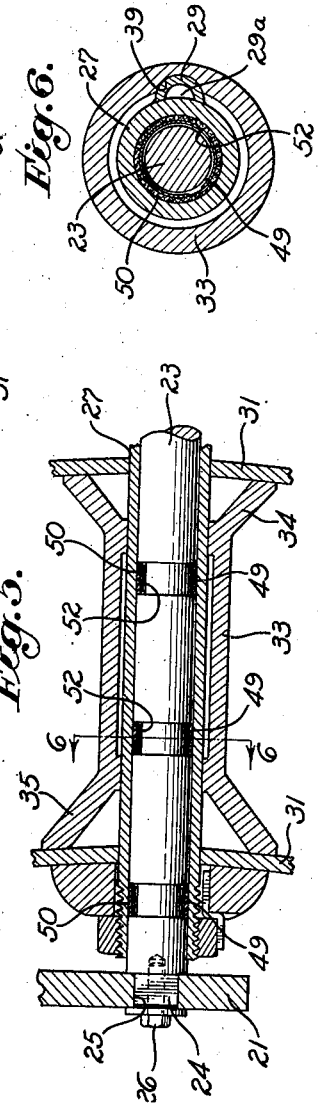
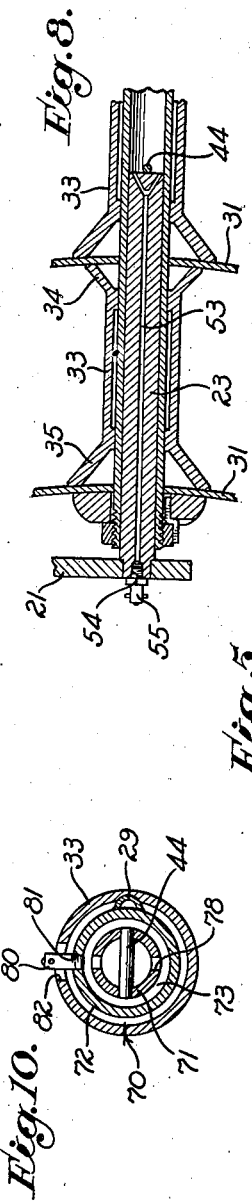
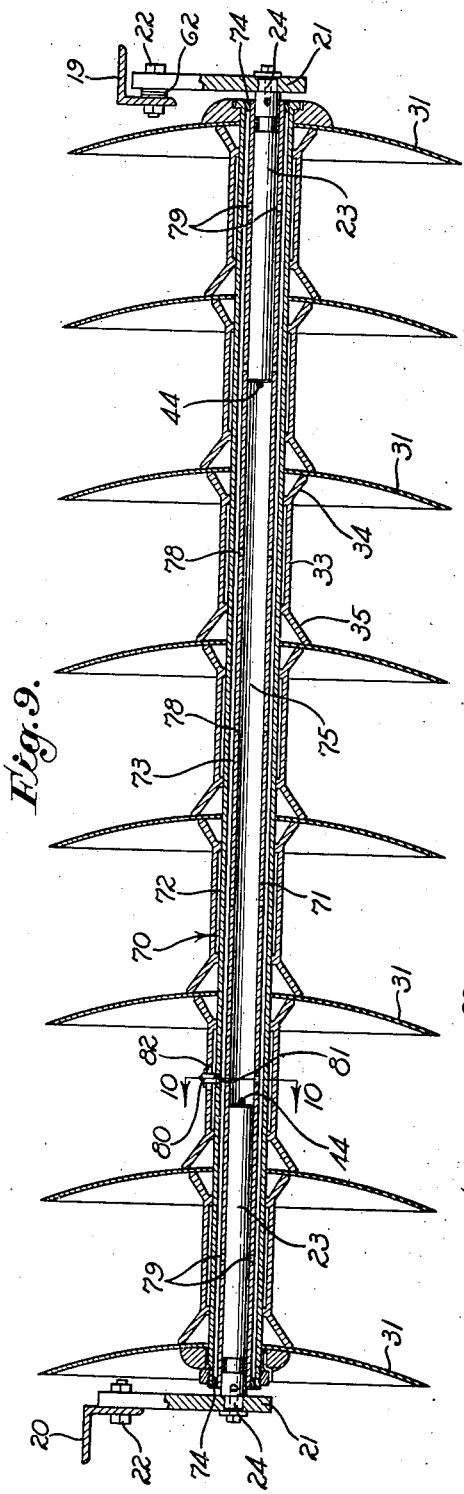
INVENTOR
OTTO W. DOMRIES
BY HARRIS, KIECH, FOSTER & HARRIS
ATTORNEYS Patented July 8, 1941

2,248,069

UNITED STATES PATENT OFFICE 2,248,069

IMPLEMENT CONSTRUCTION

Otto W. Domries, Anaheim, Calif., assignor to Howard B. Rapp and Sally Rapp, doing business as Towner Manufacturing Co., Santa Ana, Calif.

Application June 12, 1940, Serial No. 340,106

20 Claims. (Cl. 97—220)

My invention relates in general to ground working implement constructions, and has among its general objects the provision of such a construction which is inexpensive in fabrication and quickly assembled, which does not require frequent lubrication, and in which the engaging parts subjected to wear are bathed in lubricant.

My invention finds particular utility in its application to disc harrows, and it will be described as embodied in an offset disc harrow construction without limiting the invention to such use. In the conventional offset disc harrow construction the discs are mounted upon a rotating member which is supported by a fixed shaft or axle. The resistance of the ground to the forward movement of the discs in working position causes an axial thrust of very substantial amount to be exerted by the disc and the rotating member upon the stationary shaft or axle. It is a more specific object of my invention to provide novel means for transmitting this thrust from the rotating elements to the fixed elements.

During the operation of a disc harrow, there is a tendency for the earth turned by the discs to find its way between the stationary axle and the rotating disc supporting member mounted thereon, where it exerts a detrimental abrasive action on the thrust bearing surfaces.

It is another object of my invention to provide a disc harrow construction including a lubricant chamber in which the thrust bearing surfaces operate, which chamber is sealed against the entrance of earth and foreign matter thereto.

Even when such bearing surfaces are so sealed in a lubricant chamber, they are subjected to the abrasive action of some earth and foreign matter, as well as particles of metal worn therefrom during the use of the tool.

It is another object of my invention to provide a construction of the class described, which includes means for removing continuously during the operation of the tool the abrasives, such as described, from the bearing surfaces, whereby the effective life of the surfaces is substantially prolonged. My invention accomplishes such purpose by making the thrust bearing surfaces incongruent and not co-extensive, and by providing means for maintaining such bearing surfaces submerged, or at least partially submerged, in lubricant during their operation, so that any abrasives deposited upon one of the bearing surfaces is washed therefrom by the bath of lubricant, and wiped therefrom by the other bearing surface, and thus prevented from passing between the engaging bearing surfaces.

Other purposes of my invention are to provide a construction of the class described, having exceptionally effective packing means for sealing the lubricant chamber, means for adjustment of the thrust bearing members to compensate for wear, means facilitating the replacement of worn bearing members, and the quick assembly of the tool from parts requiring no accurate machine work.

An embodiment of the invention, accomplishing the foregoing purposes and providing the foregoing advantages and others, is hereinafter described. This description may be better understood with reference to the accompanying drawings in which:

Fig. 1 is a plan view of an offset disc harrow embodying my invention;

Fig. 2 is an enlarged sectional view taken as indicated by the line 2—2 of Fig. 1;

Fig. 3 is an enlarged sectional view taken as indicated by the line 3—3 of Fig. 2;

Fig. 4 is an enlarged fragmentary sectional view illustrating the construction of the packing means included in the embodiment illustrated in Fig. 2;

Fig. 5 is a fragmentary sectional view illustrating a modified form of packing construction;

Fig. 6 is an enlarged sectional view taken as indicated by the line 6—6 of Fig. 5;

Fig. 7 is a sectional view illustrating a modified form of thrust pin construction;

Fig. 8 is a fragmentary sectional view illustrating a modified form of lubricant supply means;

Fig. 9 is a section similar to Fig. 2 of a further modified form of the invention; and Fig. 10 is an enlarged sectional view taken as indicated by line 10—10 of Fig. 9.

Referring to the drawings, which are for illustrative purposes only, the numeral 11 indicates an offset disc harrow, including a front frame 12 and rear frame 13 pivoted together at 14 for movement between working and non-working positions; secured to the forward end of the front frame 12 are drawbars 15, which are connected in any suitable manner, not shown, to a tractive vehicle. A stay bar 16 is pivoted to the rear frame 13 and engages a stop 17 on the front frame 12, a release bar 18 being connected thereto for actuation from the tractive vehicle to release the stay bar.

Each of the frames 12 and 13 includes side or frame members 19 and 20, which in the form illustrated are angles, to which depending hangers 21 are secured by bolts 22. One of the hangers 21 is connected to the inner side of the vertical leg of a frame member 20, and the other of the hangers 21 is connected to the outer side of the vertical leg of the frame member 19, for a purpose which will be later described.

Attached to each of the hangers 21 is a shaft or stub axle 23. Each of the stub axles 23 is non-rotatably secured to its hanger 21, as by the projection of a reduced end 24, non-cylindrical in cross-section, through an opening 25 of similar outline in the hanger 21, and the threading of a bolt 26 into this reduced end 24 and against the hanger 21. The stub axles 23 are cylindrical and need not be machined.

Mounted upon the stub axles 23 for rotation thereon is a tool or disc supporting member or tubular member 27. The tubular member 27 has a cylindrical bore 28 of diameter slightly greater than the diameter of the stub axles 23. The tubular member 27 is provided with a substantially semi-cylindrical hollow key 29 extending parallel to the axis of the tubular member throughout its length and secured thereto as by spot welding, and defining a chamber 29a between the key and the tubular member. A stop plate 30 is mounted upon one end of the tubular member 27 and nonrotatably secured thereto as by spot welding. A plurality of discs 31 are also mounted upon the tubular member 27. Each of the discs has a central opening 32 and a recess or way connecting therewith for slidably receiving the key 29 upon the tubular member 27, so that when the discs 31 are slid upon the tubular member 27 they are held against rotation relative thereto.

As is well illustrated in Fig. 2, adjacent discs 31 are retained in their proper position axially of the tubular member 27 by spacing spools 33. Each of the spacing spools 33 has one end enlarged, as indicated by the numeral 34, for engaging the concave side of one of the discs 31, and is provided at its other end with an enlargement of greater diameter, as indicated by the numeral 35, for engaging the convex side of the adjacent disc. Intermediate the enlarged ends 34 and 35, each of the spacing spools 33 is formed with a cylindrical portion 36 having a bore 37 appreciably larger than the external diameter of the tubular member 27. A pair of annular flanges 38 project inwardly of the cylindrical portion 36 for engagement with the tubular member 27. Each of the spacing spools 33 includes a recess or way 39 to receive the key 29 of the tubular member 27 to retain the spacing spools against rotation relative thereto.

On that end of the tubular member 27 opposite to the end plate 30 is a lock plate 40 which engages the concave side of the end disc. A nut 41 is threaded upon the end of the tubular member 27 against the locking plate 40, and is held against rotation by a key 42 projecting into a radial and longitudinal opening 43 in the locking plate 40.

In order to transmit thrusts from the discs 31 and the tubular member 27 to the stub shaft 23 and frame members 19 and 20, I provide a thrust bearing means or member in the form of a pin 44 which spans the tubular member 27 diametrically across the cylindrical bore therein, adjacent the inner end of each of the stub shafts 23. The pins 44 may be hardened, if desired, to prolong their life, and, in the embodiment illustrated in Fig. 2, are secured to the tubular member by welding before the spools 33 and discs 31 are assembled thereon.

The stub shafts 23 each project into the tubular member 27 a distance less than one-half the length of the tubular member 27, and preferably extend into the tubular member 27 only to the extent necessary to provide adequate rotary bearing contact therewith. There is thus provided within the tubular member 27 and between the inner ends of the stub shafts 23 a lubricant reservoir 45 of considerable volume. In the embodiment illustrated in Fig. 2 lubricant is supplied to this reservoir 45 through an opening 46 in the tubular member 27, and a registering opening 47 in the cylindrical portion 36 of one of the spools 33. The opening 46 is closed by a suitable lubricant fitting 48 that extends through opening 47, the fitting permitting the passage of lubricant into the reservoir 45 and preventing its passage outwardly therefrom.

In order to prevent the escape of lubricant from the reservoir 45 along the stub shafts 23, and prevent the entrance of abrasives and foreign matter into the reservoir 45 along the stub shafts 23, I provide adjacent each end of the tubular member 27 an annular channel 49 in each of the stub shafts 23. Each of the annular channels 49 defines an annular chamber with the surrounding tubular member 27. As is best illustrated in Fig. 4, a packing member 50 is disposed in the channel 49. The packing member 50, which may be formed of cork or the like, having some resilience, is of a width substantially equal to the width of the channel 49, so that its edges engage side walls 51 of the channel 49. The packing member 50 is of a length such that its ends abut each other when in position engaging the inner wall of the tubular member 27. The packing member 50 is retained in engagement with the inner wall of the tubular member 27 by its resilience.

A plurality of packing means sealing the lubricant in the reservoir 45 and preventing the entrance of abrasives thereto may be provided along each of the stub shafts 23. In the embodiment illustrate in Fig. 5, I have shown three packing chambers or channels 49 in each of the stub shafts 23. I may also employ packing members which include a spring means for insuring intimate contact of the packing element with the inner wall of the tubular member 27. Thus, as is shown in Fig. 5, a band of resilient metal 52 may be disposed within the packing element 50, urging it outward into contact with the inner wall of the tubular member 27.

Means other than that illustrated in Fig. 2 and previously described, for supplying lubricant to the reservoir 45, may be utilized. For example, as shown in Fig. 8, one or both of the stub shafts 23 may be provided with a longitudinal passage 53 extending throughout the length of the stub shaft, with an enlarged portion 54 at the outer end thereof, in which a closure member or lubricant fitting 55, is secured. In such construction it is preferable to offset the inner end of the passage 53 from the center of the stub shaft 23, as illustrated in Fig. 8, or to provide the outlet of the passage 53 in the side of the stub shaft 23, so that the engaging thrust pin 44 offers no impediment to the travel of lubricant from the passage 53 to the reservoir 45.

To provide for the easy replacement of the thrust pins when they become worn, it is sometimes desirable to attach them to the tubular member 27 by means other than welding. As shown in Fig. 7, I may provide a radial opening 56 in the tubular member 27 for receiving the reduced end 57 of a thrust pin 58. A second radial opening 59 in the tubular member 27 is formed diametrically opposite the opening 56. The wall of this second opening is provided with threads so that a threaded end 60 of the thrust pin 58 may be secured therein. A slot 61 in the end of the thrust pin 58 for cooperation with a screw-driver permits it to be easily installed and removed from the tubular member 27.

In assembling my bearing construction the stop plate 30 is first secured to one end of the tubular member 27 as by welding. Thereafter, the thrust pins 44 are secured to the tubular member 27 by welding or by threading each thrust pin into the threaded opening provided in the tubular member. A disc 31 is then slid upon the tubular member 27 so that the recess communicating with the central opening 32 receives the semi-cylindrical key 29 of the tubular member 27. A spacing spool 33 is then slid upon the tubular member 27 until its enlarged end 34 engages the concave side of the installed disc 31, the recess or way 39 of the spacing spool receiving the semi-cylindrical key 29 of the tubular member 27. Thereafter a second disc is slid upon the tubular member 27 in the same manner that the first disc was installed, until its convex side engages the enlarged side 35 of the installed spacing spool 33. Additional spacing spools and discs are alternately installed until the required number are assembled. The locking plate 40 is placed upon the end of the tubular member 27 against the concave side of the end disc 31. The nut 41 is then threaded upon the end of the tubular member 27 against the locking plate 40, thus securing the assembled discs and spacing spools together upon the tubular member. The key 42 in the opening 43 of the locking plate 40 is then bent around the nut 41 to retain it against rotation.

The stub axles 23 attached to the hangers 22 may then be inserted into the tubular member 27, the packing members 50 being held in proper position in the annular chambers 49 during this step. Thereafter the hangers 21 are secured by the bolts 22 to the frame members 19 and 20. As is well illustrated in Fig. 2, shims 62 may be provided between either or both of the hangers 21 and its associated frame member. By adding shims between the hanger 21 and the frame member 20, or removing shims from between the hanger 21 and the frame member 19, the stub axles 23 may be moved more closely together, and by the reverse process the stub axles may be moved further apart. By such an arrangement it is possible upon assembling the tool to insure that the ends of the stub axles 23 are in close engagement with the thrust pins 44, and it is possible when the pins or the ends of the stub axles become worn, to move the stub axles closer together, and thus compensate for wear.

Thereafter the fitting 48 is secured in the openings 46 and 47 of the tubular member 27 and the spool 33 respectively, and a lubricant is supplied through the fitting until the reservoir 45 is completely filled.

During the operation of the harrow, a thrust is exerted by the earth upon the discs, tending to move them along the stub axles 23 towards that end of the frame towards which the convex sides of the discs are faced. Thus in Fig. 2 this thrust is exerted towards the right frame member 19. This thrust is transmitted from the discs 31 through the tubular member 27 and the right-hand pin 44 against the right-hand stub axle 23, and thence to the frame. A workable tool could be built employing only one of the thrust members 44, if it were employed under uniform conditions. However, due to the lack of uniformity in actual practice and due to the fact that two such thrust members may be provided at extremely small expense, I prefer to employ two thrust pins, as illustrated in Fig. 2.

It will be seen that the packing members 50 prevent the escape of lubricant from the reservoir 45 and the entrance of dirt and abrasive matter thereinto between the tubular member 27 and the stub shaft 23. It will be noted that the bearing surface of each of the pins 44 is incongruent with and less extensive than its companion bearing surface upon the end of a stub shaft 23. Consequently, during successive stages of the relative rotation of these bearing surfaces, successive portions of the bearing surface on the inner end of each of the stub shafts are out of engagement with the companion pin 44. These unengaged portions of the bearing surfaces are in contact with and washed by the body of lubricant within the reservoir 45. Any small amount of dirt or abrasive matter which may find entrance to the reservoir 45, together with any particles of metal worn from the bearing surfaces, are therefore washed from the unengaged portions of the bearing surfaces of the stub axles by the lubricant, and are wiped therefrom by the pins 44, and thus effectively prevented from passing between the thrust bearing surfaces in engagement.

The modification of my invention indicated by Figs. 9 and 10 consists essentially of the substitution of a double tube generally designated 70 for the single tubular member 27, the construction being in other respects similar to that shown in Figs. 1 to 4, and corresponding numerals being used to indicate corresponding parts. The double tube 70 comprises an inner tubular member 71 and an outer tubular member or disc support 72 defining therewith an annular space 73. Corresponding ends of the two tubular members are welded to common rings or bushings 74 that serve to seal the opposite ends of the annular space 73.

The inner tubular member 71 has the previously described relationship to the two stub shafts 23, the inner tubular member rotatably embracing the two shafts and providing a cylindrical space 75 between the two shafts. It is contemplated that the inner tubular member 71 will have at least one aperture to provide communication between the angular space 73 and the cylindrical space 75 so that the two spaces may function as a single lubricant chamber. Preferably a number of such apertures are provided, including apertures 78 for direct communication between the two spaces and apertures 79 for direct communication from the annular space 73 to the periphery of each stub shaft 23. Any suitable passage means may be provided for introducing lubricant into either the annular space 73 or the cylindrical space 75. For example, as best shown in Fig. 10, a lubricant fitting 80 may be mounted in a bore 81 in the outer tubular member 72, one of the spools 33 having an aperture 82 clearing the lubricant fitting. Fig. 10 also shows that the outer tubular member 72 is provided with the previously described semi-cylindrical key 29 for engagement with the various discs and spools mounted thereon.

The form of the invention shown in Figs. 9 and 10 has certain advantages over the earlier described embodiments in that it provides for greater lubricant capacity and provides unrestricted lubricant passages direct to the peripheral surfaces of the two stub shafts.

While the embodiments of my invention hereinbefore illustrated and described are fully capable of fulfilling the objects and advantages primarily stated, there are other embodiments capable of fulfilling such objects and advantages, and I, therefore, wish my invention not to be specifically limited to the embodiments hereinbefore described.

I claim as my invention:

1. In a disc harrow, the combination of: frame members; stub axles so connected to said members as to be axially shiftable and nonrotatable relative thereto; a tubular member rotatably mounted upon said axles, the interior wall of said tubular member cooperating with said axles in providing an annular chamber intermediate the ends of each of said axles, discs secured to said tubular member; pins removably connected to said tubular member and bearing against the inner ends of said axles for transmitting thrust from said discs through said axles to said frame members; packing means in each of said chambers engaging said wall, said means defining a reservoir within said tubular member and sealing such reservoir against the escape of lubricant therefrom and the entrance of abrasive matter thereto; and a closable opening in said tubular member for supplying lubricant to the reservoir.

2. In a disc harrow, the combination of: frame members; stub axles so connected to said members as to be axially shiftable and nonrotatable relative thereto; a tubular member rotatably mounted upon said axles, the interior wall of said tubular member having walls cooperating with said axles in providing an annular chamber intermediate the ends of each of said axles, discs secured to said tubular member; pins connected to said tubular member and bearing against the inner ends of said axles for transmitting thrust from said discs through said axles to said frame members; packing means in each of said chambers extending throughout substantially all of the axial length of said chambers and resiliently engaging the outer walls of said chambers, said means defining a reservoir within said tubular member and sealing such reservoir against the escape of lubricant therefrom and the entrance of abrasive matter thereinto; and a closable opening in said tubular member for supplying lubricant to the reservoir.

3. In a disc harrow, the combination of: frame members; stub axles so connected to said members as to be axially shiftable and nonrotatable relative thereto; a tubular member rotatably mounted upon said axles, said axles having annular channels therein cooperating with said tubular members in defining a plurality of annular chambers intermediate the ends of each of said axles; discs secured to said tubular member; pins connected to said tubular member and bearing against the inner ends of said axles for transmitting thrust from said discs through said axles to said frame members; packing means in each of said chambers extending throughout substantially all of the axial length of said chambers and resiliently engaging the outer wall of said chambers, said means defining a reservoir within said tubular member and sealing such reservoir against the escape of lubricant therefrom and the entrance of abrasive matter thereinto; and a closable opening in said tubular member for supplying lubricant to the reservoir.

4. In a disc harrow, the combination of: frame members; stub axles so connected to said members as to be axially shiftable and nonrotatable relative thereto; a tubular member rotatably mounted upon said axles, said tubular member having an inner wall cooperating with said axles in providing an annular chamber intermediate the ends of each of said axles, and having a longitudinal key on the outer surface thereof; discs mounted upon said tubular member, each of said discs having a recess therein for said key on said tubular member; spacing elements mounted upon said tubular member between adjacent discs, each of said elements having a recess therein for the reception of said key on said tubular member; pins removably connected to said tubular member and bearing against the ends of said axles for transmitting thrust from said discs through said axles to said frame members; packing means in each of said chambers engaging said wall, said means defining a reservoir within said tubular member and sealing such reservoir against the escape of lubricant therefrom and the entrance of abrasive matter thereto; and a closable opening in said tubular member for supplying lubricant to the reservoir.

5. In a disc harrow, the combination of: frame members; stub axles so connected to said members as to be axially shiftable and nonrotatable relative thereto; a tubular member rotatably mounted upon said axles, said tubular member having an inner wall cooperating with said axles in providing an annular chamber intermediate the ends of each of said axles; discs secured to said tubular member; pins removably connected to said tubular member and bearing against the inner ends of said axles for transmitting thrust from said discs through said axles to said frame members; packing means in each of said chambers engaging said wall, said means defining a reservoir within said tubular member and sealing such reservoir against the escape of lubricant therefrom and the entrance of abrasive matter thereinto; and a closable opening in one of said axles for supplying lubricant to the reservoir.

6. In a disc harrow, the combination of: frame members; stub axles nonrotatably connected to said members; a tubular member rotatably mounted upon said axles, said tubular member having an inner wall cooperating with said axles in providing an annular chamber intermediate the ends of each of said axles; discs secured to said tubular member; pins removably connected to said tubular member and bearing against the inner ends of said axles for transmitting thrust from said discs through said axles to said frame members; packing means in each of said chambers engaging said wall, said means defining a reservoir within said tubular member and sealing such reservoir against the escape of lubricant therefrom and the entrance of abrasive matter thereinto; and a closable opening in said tubular member for supplying lubricant to the reservoir.

7. In a disc harrow construction, the combination of: frame members; stub shafts connected to said members; a tubular disc supporting member mounted upon said shafts; discs secured upon said supporting member; thrust members associated with said supporting member and projecting across the interior thereof in engagement with the ends of said shafts; and packing means between each of said shafts and said supporting member.

8. In a disc harrow construction, the combination of: frame members; stub shafts connected to said members, each of said shafts having a thrust bearing surface on the inner end thereof; a tubular disc supporting member mounted upon said shafts; discs secured upon said supporting member; packing means between each of said shafts and said supporting member defining a lubricant chamber in the interior of said disc supporting member; thrust members for cooperation with said shafts secured to said supporting member and projecting into said lubricant chamber, each of said thrust members having a bearing surface incongruent with said bearing surface of the corresponding shaft whereby successive portions of one of each of said pairs of cooperating bearing surfaces are out of engagement with the other cooperating bearing surface during successive stages of their relative rotation; and means for supplying lubricant to said lubricant chamber to wash said unengaged portions of said bearing surfaces.

9. In a disc harrow construction, the combination of: frame members; stub shafts connected to said members, each of said shafts having a thrust bearing surface on the inner end thereof; a tubular disc supporting member mounted upon said shafts, discs secured upon said supporting member; packing means between each of said shafts and said supporting member defining a lubricant chamber in the interior of said disc supporting member; thrust members secured to said supporting member and projecting into such lubricant chamber to bear against the inner ends of said axles, each of said thrust members having a bearing surface which is not co-extensive with the adjacent shaft thrust bearing surface.

10. In an implement construction, the combination of: frame members; stub axles non-rotatably secured thereto; a supporting member having a bore therein and rotatably mounted upon said axles, each of said axles being provided with a thrust bearing surface within such bore; a ground working implement attached to said supporting member; thrust members connected to said supporting member and having bearing surfaces engaging said bearing surfaces of said axles but not co-extensive therewith; and means for maintaining a lubricant in contact with those portions of each of said bearing surfaces out of engagement with its companion bearing surface.

11. In an implement construction, the combination of: frame members; stub axles non-rotably secured thereto; a supporting member having a bore therein and rotatably mounted upon said axles, each of said axles being provided with a thrust bearing surface within said bore; a ground working implement attached to said supporting member; thrust members connected to said supporting member and having bearing surfaces engaging said bearing surfaces of said axles but not co-extensive therewith; walls forming a packing chamber between each of said axles and said supporting member; packing means in each packing chamber defining with the bore of said supporting member a lubricant chamber; and means communicating with said lubricant chamber permitting the introduction of lubricant thereto and preventing the escape of lubricant therefrom.

12. In an implement construction, the combination of: frame members; stub axles non-rotatably secured thereto; a supporting member having a bore therein and rotatably mounted upon said axles, each of said axles being provided with a thrust bearing surface within said bore; a ground working implement attached to said supporting member; thrust members connected to said supporting member and having bearing surfaces engaging said bearing surfaces of said axles but not co-extensive therewith; walls forming a packing chamber between each of said axles and said supporting member; packing means in each packing chamber defining with the bore of said supporting member a lubricant chamber; a resilient element engaging each of said packing means and maintaining said means in sealing relationship with one of said walls of said packing chamber; and means communicating with said lubricant chamber permitting the introduction of lubricant thereto and preventing the escape of lubricant therefrom.

13. In an implement construction the combination of: frame members; axles secured to said members; a supporting member having a bore therethrough and journaled upon said axles, each of said axles being provided with thrust bearing means within said bore; a ground working implement attached to said supporting member; thrust bearing means connected to said supporting member and provided with a thrust bearing surface for engagement with a thrust bearing surface of said bearing means of said axles, said thrust bearing surfaces in engagement being incongruent; and packing means between each of said axles and said supporting member.

14. In an implement construction, the combination of: frame members; axles so secured to said members as to be axially adjustable relative thereto; a supporting member having a bore therethrough and journaled upon said axles, each of said axles being provided with thrust bearing means within said bore; a ground working implement attached to said supporting member; thrust bearing means connected to said supporting member and provided with thrust bearing surfaces for engagement with thrust bearing surfaces of said bearing means of said axles respectively, each cooperating pair of said thrust bearing surfaces being incongruent, one of each pair of said cooperating bearing means being removable; and packing means between each of said axles and said supporting member.

15. In an implement construction, the combination of: frame members; axles so secured to said members as to be axially adjustable relative thereto; a supporting member having a bore therethrough and journaled upon said axles, each of said axles being provided with thrust bearing means within said bore; a ground working implement attached to said supporting member; thrust bearing means connected to said supporting member and provided with a thrust bearing surface for engagement with a thrust bearing surface of said bearing means of said axles, said thrust bearing surfaces in engagement being incongruent, one of each of said bearing means being removable; packing means between each of said axles and said supporting member defining a lubricant chamber in said bore of said supporting member; and means for supplying lubricant to said bore.

16. In a disc harrow construction, the combination of: a frame member; stub shafts connected to said frame member; a disc supporting member mounted upon said shafts, said supporting member being of cylindrical configuration and having a bore therein embracing said shafts; key means projecting from the periphery of said disc supporting member and extending substantially throughout the length of said supporting member; discs secured upon said supporting member in engagement with said key means; spacer members on said supporting member intermediate said discs; and thrust members operative between said disc supporting member and said stub shafts to limit axial movement of said supporting member relative to said shafts.

17. In a disc harrow construction, the combination of: a frame member; stub shafts connected to said frame member; a tubular member rotatably embracing said stub shafts; a disc supporting member surrounding said tubular member in radially spaced relation thereto and forming therewith an annular space; annular means at each end of said supporting member securing the disc supporting member to said tubular member and closing the ends of said annular space; and thrust means cooperative with said tubular member and said shafts to limit axial movement of the tubular member relative to said shaft, there being an entrance to said annular space for the introduction of lubricant thereinto and openings in said tubular member for transmission of lubricant from said annular space to said thrust means.

18. In a disc harrow construction, the combination of: a frame member; stub shafts connected to said frame member; a tubular member rotatably embracing said stub shafts and forming a cylindrical lubricant space therebetween; a disc supporting member surrounding said tubular member in radially spaced relation thereto and forming therewith an annular space; annular means at each end of said supporting member securing the supporting member to said tubular member and closing the ends of said annular space, said tubular member being apertured to provide communication between said cylindrical space and said annular space, there being a passage to one of said spaces for the introduction of lubricant thereinto; and thrust members mounted on said tubular member in engagement with said shafts to limit axial movement of the tubular member relative to said shafts.

19. In a disc harrow construction, the combination of: a frame member; stub shafts connected to said frame member; a tubular member rotatably embracing said stub shafts and forming a cylindrical lubricant space therebetween; a disc supporting member surrounding said tubular member in radially spaced relation thereto and forming therewith an annular space; annular means at each end of said supporting member securing the disc supporting member to said tubular member and closing the ends of said annular space, said tubular member having apertures at the peripheries of each of said shafts and at said intermediate cylindrical space, thereby providing for communication between said spaces, there being a passage to one of said spaces for the introduction of lubricant thereinto; discs secured upon said supporting member; thrust members mounted on said tubular member in engagement with said shafts to limit axial movement of the tubular member relative to said shafts; and packing means between each of said shafts and said supporting member beyond the range of said apertures in the tubular member to prevent the escape of lubricant from said cylindrical and annular spaces and to prevent the entrance of abrasive matter thereinto.

20. In an implement construction the combination of a frame; shaft members connected to said frame; a tubular tool-supporting member mounted upon said shaft members, said members providing annular recesses; and a packing ring of resilient material in the form of an incomplete annulus in each of said recesses, sealing the space between said members and defining with said members a lubricant chamber.

OTTO W. DOMRIES.